(12) United States Patent
Naslund et al.

(10) Patent No.: US 7,725,709 B2
(45) Date of Patent: May 25, 2010

(54) METHODS FOR SECURE AND BANDWIDTH EFFICIENT CRYPTOGRAPHIC SYNCHRONIZATION

(75) Inventors: Mats Naslund, Vallingby (SE); Karl Norrman, Stockholm (SE); Vesa Petteri Lehtovirta, Espoo (FI); Alex Krister Raith, San Diego, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 860 days.

(21) Appl. No.: 11/470,554

(22) Filed: Sep. 6, 2006

(65) Prior Publication Data
US 2007/0113085 A1 May 17, 2007

Related U.S. Application Data

(60) Provisional application No. 60/715,873, filed on Sep. 9, 2005.

(51) Int. Cl.
*H04L 29/06* (2006.01)
(52) U.S. Cl. ............... 713/151; 370/394; 370/503; 713/152; 380/255
(58) Field of Classification Search ............ 713/168, 713/151–152; 380/244–246, 255–270; 726/32, 726/17; 370/394, 503
See application file for complete search history.

(56) References Cited

U.S. PATENT DOCUMENTS

| | | | | |
|---|---|---|---|---|
| 4,625,690 A | * | 12/1986 | Morita | ........................ 123/350 |
| 4,974,148 A | * | 11/1990 | Matteson | ..................... 713/600 |
| 5,699,392 A | * | 12/1997 | Dokic | ........................ 375/376 |
| 7,406,082 B2 | * | 7/2008 | Nagarajan et al. | ............ 370/394 |
| 2005/0063544 A1 | * | 3/2005 | Uusitalo et al. | .............. 380/277 |
| 2005/0111666 A1 | * | 5/2005 | Blom et al. | .................. 380/277 |

OTHER PUBLICATIONS

Baugher D. McGrew Cisco Systems et al: "The Secure Real- time Transport Protocol (SRTP)" IETF Standard, Internet Engineering Task Force, IETF, CH, Mar. 2004, XP015009491 ISSN:0000-0003, p. 8 line 4, p. 9 line 5. p. 13 line 7, p. 14 line 10.
Baugher et al. "The Secure Real-time Transport Protocol (SRTP)" Network Working Group RFC 3711, Mar. 2004.
Arkko et al. "MIKEY: Multimedia Internet KEYing" Network Working Group RFC 3830, Aug. 2004.
Perrig et al. "Timed Efficient Stream Loss-Tolerant Authentication (TESLA): Multicast Source Authentication Transform Introduction" Network Working Group RFC 4082.
Kent et al. "IP Encapsulating Security Payload (ESP)" Network Working Group Internet Draft, Mar. 2005.

* cited by examiner

*Primary Examiner*—Edan Orgad
*Assistant Examiner*—Brian Olion
(74) *Attorney, Agent, or Firm*—Roger S. Burleigh

(57) ABSTRACT

Methods for cryptographic synchronization of data packets. A roll-over counter (ROC) value is periodically appended to and transmitted with a data packet when a function of the packet sequence number equals a predetermined value. The ROC effectively synchronizes the cryptographic transformation of the data packets. Although the disclosed methods are generally applicable to many transmission protocols, they are particularly adaptable for use in systems wherein the data packets are transmitted to a receiver using the Secure Real-Time Transport Protocol (SRTP) as defined in Internet Engineering Task Force (IETF) Request for Comments (RFC) 3711.

16 Claims, 1 Drawing Sheet

METHODS FOR SECURE AND BANDWIDTH EFFICIENT CRYPTOGRAPHIC SYNCHRONIZATION

CROSS-REFERENCE TO RELATED APPLICATIONS

This application claims the benefit of U.S. Provisional Application No. 60/715,873, filed Sep. 9, 2005, the disclosure of which is incorporated herein by reference.

TECHNICAL FIELD OF THE INVENTION

The invention is related, in general, to the field of communications and, in particular, to the field of secure communications.

BACKGROUND OF THE INVENTION

A security, or cryptographic, protocol is an abstract or concrete protocol that performs a security-related function and applies cryptographic methods. Cryptographic protocols are widely used for secure application-level data transport. A cryptographic protocol usually incorporates at least some of these aspects: key agreement or establishment; entity authentication; symmetric encryption and message authentication material construction; secured application-level data transport; and non-repudiation methods.

A cryptographic protocol running over an unreliable transport mechanism requires means to synchronize the transmitter and receiver, for example, due to packet loss or packet reordering. At the lowest level, a receiver must be able to correctly assemble data packets into "intelligible" data; e.g., it must know if a data packet is missing so that it can request retransmission. Synchronization is typically accomplished by adding a sequence number to each pocket or by using an already existing sequence number. Such sequence numbers are then input to a cryptographic algorithm, together with the proper key, and synchronization is obtained on a per-packet basis. The latter approach is preferred, however, since it does not increase the amount of data and, thus, the necessary bandwidth.

Due to the properties of cryptographic transforms, the same sequence number should never be used twice with the same key. Conventional built-in counters, however, are typically only 16 bits and, thus, in high speed communications, a 16-bit sequence number space may "wrap" within a matter of seconds, leading to inefficiency due to necessary frequent re-keying. For example, with a 16-bit sequence number, every $2^{16}$ packet will contain identical sequence numbers, and thus a receiver is unable to distinguish such packets.

To get around this problem, a roll-over counter ("ROC") can be used to define an "extended" sequence number. For a 16-bit sequence number (sequence_number) and extended sequence number (EXTENDED_SEQ) could be equal to sequence_number+ROC*$2^{16}$. In such systems, the ROC should be updated on the transmitter and receiver sides whenever sequence_number "wraps" modulo $2^{16}$. The ROC value, however, is typically not carried in the packets, but is implicitly maintained by the transmitter and receiver. It can be shown, however, that as long as packet re-order/loss is not more than $2^{15}$, it is possible to maintain synchronization by estimating the ROC value based on heuristic methods; see, for example the Appendix of Internet Engineering Task Force (IETF) Request for Comments (RFC) 3711, "Secure Real-time Transport Protocol" ("SRTP").

In some applications where users may join or leave an ongoing session (e.g., 3GPP Multi-cast and broadcast services (MBMS); where SRTP is to be used), however, the "extended" mechanism is not sufficient due to the fact that each user must be given the current ROC value and it is not trivial how to accurately transfer the information to the users. SRTP currently does not provide a mechanism to provide the ROC value using inband signaling. It is possible, however, to signal the value out-of-band using a key management protocol (e.g., Multimedia Internet KEYing ("MIKEY"), IETF RFC3830). The problem with this approach is that key management is typically performed by a separate process and it is not unlikely that the key management is performed long before a user decides to join a session. In this case, the value of ROC that was used when key management was performed will not be valid when a user joins a session.

Even though key management is performed more or less in synchronization with SRTP stream processing, it is possible that the ROC value will be incorrect due to the way SRTP estimates the extended sequence number. For example, assume that the media (SRTP) sequence number has just wrapped around (e.g., is equal to 0x0000) and that the key management reads the ROC value at this point in time. Next, the ROC value is transported to the user (receiver) and the user reads the ROC value and stores it for reference. Since it is possible that packets are re-ordered on the path between the media server and the user, the first media (SRTP) packet the user receives could be a delayed packet which happens to have, for example, a sequence number equal to 0xFFFF. In this situation, SRTP may process this (delayed) packet with a ROC value that is one too high. Also, the next SRTP packet received is likely to have a sequence number equal to 0x0000. In this situation, SRTP would guess, or estimate, that the sequence number has wrapped around and, thus, would increase its ROC value by one. This would cause loss of synchronization. Under conditions of heavy packet loss, or if the user leaves a session and rejoins after such a long period of time that the ROC has wrapped around at least one time, the problem re-appears.

Accordingly, there is a need in the art for methods for secure and bandwidth efficient cryptographic synchronization. Preferably, such methods should make efficient use of bandwidth and protect against unauthorized manipulation.

SUMMARY OF THE INVENTION

To overcome the deficiencies of the prior art, the present invention discloses methods for secure and bandwidth efficient cryptographic synchronization. In general, a roll-over counter (ROC) value is periodically appended to and transmitted with a data packet when a function of the packet sequence number equals a predetermined value. The ROC effectively synchronizes the cryptographic transformation of the data packets.

According to an exemplary embodiment described more fully hereinafter, a data packet is received at a transmitter for transmission to a receiver, the method is particularly adaptable for use in systems wherein the data packets are transmitted to a receiver using the Secure Real-Time Transport Protocol (SRTP) as defined in Internet Engineering Task Force (IETF) Request for Comments (RFC) 3711, which is incorporated herein by reference. The transmitter first determines whether a packet sequence number for the data packet is evenly divisible by R, where R is an integer previously agreed to by the transmitter and the receiver. The transmitter and receiver can, for example, communicate out-of-band to select a value of R; suitable protocols for such purpose include Session Initiation Protocol (SIP), Secure Real-Time Transport (RTSP), and Multimedia Internet KEYing (MIKEY).

If the packet sequence number is evenly divisible by R, the transmitter computes and appends a code to the data packet, wherein the code is a function of a authentication key associated with the data packet and a transmitter roll-over counter (ROC) value. The transmitter ROC value corresponds to a counter in the transmitter that is incremented whenever a sequence number counter in the transmitter rolls over. The transmitter also appends the transmitter ROC value to the data packet, and the data packet is then transmitted to the receive. If the packet sequence number is not evenly divisible by R, however, the transmitter simply transmits the data packet without appending the transmitter ROC value.

Upon receipt, the receiver determines if the transmitter ROC value is appended to the data packet, wherein the presence of a transmitter ROC value is indicated if the packet sequence number is evenly divisible by R. If the data packet does not include a transmitter ROC value, the receiver performs packet security processing using an estimated ROC value, depending on the receiver's locally maintained ROC value. If the data packet does include a transmitter ROC value, the transmitter performs packet security processing using the transmitter ROC value rather than the receiver ROC value (or estimate of the ROC value). As part of this security processing, the integrity of the data packet is determined. If the integrity of the data packet is not confirmed, the data packet is dropped and not further processed. Otherwise, if the integrity of the data packet is confirmed, the receiver ROC value is set to the transmitter ROC value.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as defined by the claims provided hereinafter.

BRIEF DESCRIPTION OF THE FIGURE

To illustrate the features and functions of the invention, reference is now made to the following detailed description taken in conjunction with the accompanying drawing, in which.

DETAILED DESCRIPTION

Figure 1:
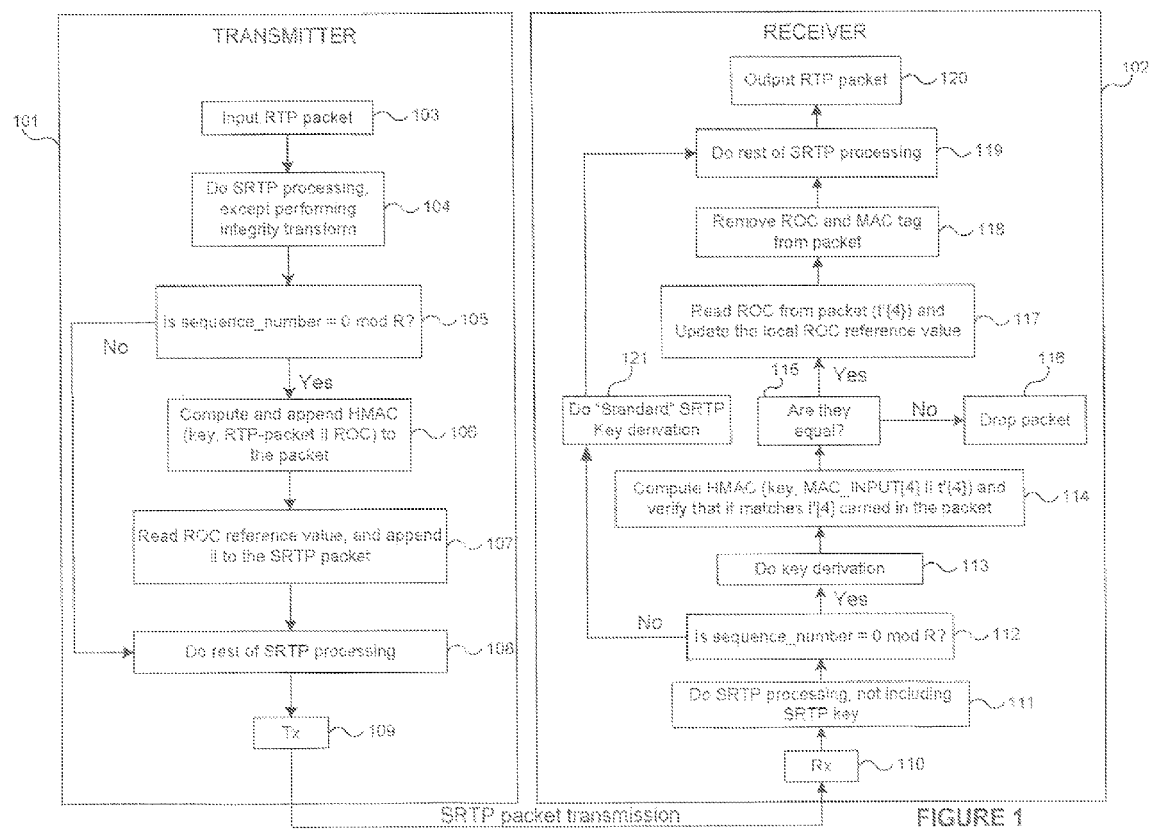
FIG. 1 illustrates a system, and methods therein, for secure and bandwidth efficient cryptographic synchronization in accordance with the principles of the invention.

FIG. 1 illustrates a system, and methods therein, for secure and bandwidth efficient cryptographic synchronization in accordance with the principles of the invention. The system comprises a transmitter 101 and receiver 102, each operative to perform certain operations in accordance with the principles described hereinafter. The method for cryptographic synchronization is specifically described herein with respect to an exemplary system wherein the data packets are transmitted to a receiver using the Secure Real-Time Transport Protocol (SRTP) as defined in Internet Engineering Task Force (IETF) Request for Comments (RFC) 3711. Those skilled in the art, however, will recognize the general applicability of the method to systems based on other transmission protocols, and the adaptations, if any, required for such other protocols.

To implement the principles of the invention in an SRTP-based system, a message authentication algorithm, referred to herein as eXtended Message Authentication Code (XMAC), can be added to the SRTP framework. XMAC can be based, for example, on the Internet Engineering Task Force (IETF) Hash-based Message Authentication Code (HMAC), or any other secure MAC. From an STRP framework perspective, as those skilled in the art will recognize from the description that follows, XMAC works essentially like any other MAC algorithm. In addition to an authentication key, however, XMAC includes a parameter R, which is an integer in the range $0-2^{16}$. The transmitter 101 and receiver 102 can agree on MAC and a value for R using, for example, out-of-band signalling as known in the art; suitable protocols for such purpose include Session Initiation Protocol (SIP), Secure Real-Time Transport (RTSP), and Multimedia Internet KEYing (MIKEY).

According to the method, a data packet is received at the transmitter 101 for transmission to the receiver 102 (Step 103). Next (Step 104), SRTP processing is performed on the data packet except for an integrity transform. This step involves deriving keys to be used for data protection (i.e., encryption and integrity protection) and processing the data packet up until the point the integrity protection is to be applied (e.g., any possible SRTP encryption should be performed during this step).

Subsequent steps constitute XMAC integrity protection for the data packet, including header and payload. First (Step 105), it is determined whether the data packet's sequence number (sequence_number), which is available in the packet header, is evenly divisible by R (i.e., 0 mod R). If the packet sequence number is not evenly divisible by R, no MAC tag is to be added to the data packet and processing of the data packet continues at Step 108, wherein SRTP processing of the data packet is completed prior to transmission (Step 109). If the packet sequence number is evenly divisible by R, a MAC tag is to be computed for the data packet.

In Step 106, a MAC tag is computed and added to the data packet. The MAC is a function of the SRTP authentication key associated with the data packet and a transmitter roll-over counter (ROC) value, formulaically expressed as HMAC (key, RTP_packet || ROC). The transmitter ROC value corresponds to a counter in the transmitter that is incremented whenever a sequence number counter in the transmitter rolls over. Next (Step 107), the transmitter ROC value is also appended to the data packet; i.e., the data packet has now been appended with HMAC(key, RTP_packet ||ROC) || ROC. Steps 106 and 107 have the effect of adding the transmitter ROC value, integrity protected by a MAC value, to every $R^{th}$ packet. The input to the MAC (i.e., RTP_packet || ROC) will automatically (according to RFC3711) be formatted this way by the SRTP framework and provided as input. Those skilled in the art should note that the transmitter ROC value will not be transmitted as part of the packet payload, but as part of the MAC tag; i.e., HMAC(key, RTP_packet || ROC) || ROC can be viewed as the output authentication tag of the XMAC.

Finally, as with data packets having a sequence number not evenly divisible by R, processing of the data packet continues at Step 108, wherein SRTP processing of the data packet is completed prior to transmission (Step 109) to the receiver 102. Those skilled in the art should recognize that although the process performed in receiver 102 commences with Step 110, the operations of transmitter 101 and receiver 102 are asynchronous.

Upon receipt of a data packet (Step 110), SRTP processing is performed up to, but not including, the step of SRTP key derivation. Next (Step 112), it is determined whether a transmitter roll-over counter (ROC) value is appended to the data packet. The presence of a transmitter ROC value, as well as XMAC, appended to a data packet is indicated if the packet sequence number is evenly divisible by R (i.e., sequence_number=0 mod R).

If no ROC/XMAC is appended to a data packet, processing continues at Step 121, wherein standard SRTP key derivation is performed using conventional ROC estimation. In such cases, the receiver 102 considers its locally-stored ROC value (ROC_L), which is typically the ROC value associated with the previous packet. The receiver then examines the sequence number (SEQ) in the just received data packet and the highest previously received sequence number (S_L), which is also tracked by the receiver. Using those three values (ROC_L, SEQ, and S_L), the receiver can estimate what ROC value was used by the transmitter at the time the data packet was transmitted. This can be done in several ways, such as described in the Appendix to IETF RFC 3711, referred to therein as "index estimation." As an example, if the present ROC_L value is "x", S_L is three (0x0003) and the received SEQ is 0xffff, the receiver will guess that the present data packet is a delayed packet (delayed by four "units" of time), corresponding to ROC=ROC_L−1 (i.e., x−1) since a "wrap" of SEQ occurred between receipt of the two packets. (Those skilled in the art will recognize that after SEQ=0xffff, the next SEQ will wrap and the next packet has SEQ=0x0000, etc.) It could of course also be the case that the packet indeed corresponds to the same ROC_L value and that, in fact, $2^{10}$-3 consecutive packets have been lost. This scenario, however, is less likely, so it can be said that the receiver uses a "maximum-likelihood" estimation technique; i.e., it chooses the most likely ROC assuming the minimum consistent amount of loss/re-ordering/delay has taken place.

If the data packet does includes a transmitter ROC value (Step 112), SRTP key derivation is performed using the transmitter ROC value rather than the receiver ROC value (Step 113). Next (Step 114), the integrity of the data packet is determined. This can be accomplished by checking the XMAC appended to the packet using the derived key to verify the data has not been corrupted or tampered with (in particular that the transmitter ROC value is correct). For example, let "MAC_INPUT" be the data value supplied by SRTP as data input to XMAC (i.e., the authentication portion of the SRTP packet as defined in RFC 3711) and let t' be the received tag, also supplied as input by SRTP. Next, compute t=HMAC(key, MAC_INPUT ∥ t'{4}) and compare this to the value t'[4] as included in the packet, wherein X[n] denotes the substring corresponding to all but the n nightmost bytes of X and X{n} denotes the n rightmost bytes of X. The XMAC is verified if and only if the values t and t'[4] are equal.

If the integrity of the data packet is not confirmed (Step 115), the data packet is dropped (Step 116). Otherwise, if the integrity of the data packet is confirmed (Step 115), the receiver ROC value is set to the transmitter ROC value contained in the data packet (Step 117), thereby synchronizing the ROC values of the transmitter 101 and receiver 102. Next, in Step 118, the transmitter ROC value and the XMAC are removed from the data packet, followed by the completion of SRTP processing (e.g., decryption) on the data packet (Step 119). Finally, the data packet can be output to an application (Step 120).

In an alternate embodiment to that described, all data packets with sequence_number=0 mod R will carry a MAC, computed over the data packet and the ROC, but only every $R^{th}$ tag will contain the ROC value itself. In other words, the transmitter ROC value is always used in the input to the MAC tag computation, but the transmitter ROC value is only made part of the output of the MAC for every $R^{th}$ packet. This embodiment can be used if all data packets in a session should always be integrity protected.

Those skilled in the art familiar with the SRTP protocol will recognize that the only change to the SRTP framework necessary to implement the ROC synchronization disclosed herein is use of the received transmitter ROC value, rather than the local receiver ROC value, for key derivation. All other operations can be handled internally by the XMAC transform, which can be viewed as a "black box" from the SRTP protocol perspective. Those skilled in the art will also note that although the foregoing description only shows how an extended sequence_number can be transported, the principles disclosed herein can be adapted to convey other types of synchronization data. Similarly, the synchronization data, rather than being transformed as part of a MAC tag, can be transported within other locations of a data packet (e.g., part of a key indicator, payload, packet header, etc.).

In other alternative embodiments, the decision of whether to include ROC in data packets using methods other than even divisibility by R are possible. In general, let F by any function mapping the sequence numbers into the set {0,1}. A function (F) is first agreed between sender and receiver. The sender (and receiver) then apply F to the sequence number (s) of a given packet and add ROC-information if, and only if, F(s)=1. In the previous example, F(s) is 1 if and only if s is divisible by R.

From the foregoing, it will be recognized that the invention provides significant advantages over the prior art. First, re-synchronization means for ROC values are provided with minimal changes to existing protocols, such as SRTP. Second, bandwidth can be saved by appropriately setting the R parameter value, since only one packet in every $R^{th}$ data packet will have extra overhead. Moreover, the transmitter ROC value is securely transferred since it is protected by a MAC, thereby avoiding Denial of Service (DoS) attacks. Furthermore, it is trivial for a receiver to tell which data packets contain re-synchronization information (i.e., a transmitter ROC value), without "flags" or other overhead.

We claim:

1. A method in a transmitter for cryptographic synchronization of data packets, wherein said data packets are transmitted to a receiver using the Secure Real-Time Transport Protocol (SRTP) as defined in Internet Engineering Task Force (IETF) Request for Comments (RFC) 3711, said method comprising the steps of:
    receiving a data packet for transmission;
    performing SRTP processing on said data packet except for integrity transform;
    determining whether a packet sequence number for said data packet is evenly divisible by R, where R is an integer previously agreed to by said transmitter and said receiver; and,
    if the packet sequence number is not evenly divisible by R;
        completing SRTP processing on said data packet; and,
        transmitting said data packet to said receiver;
    if the packet sequence number is evenly divisible by R;
        computing and appending a message authentication code (MAC) to said data packet, wherein said MAC is a function of an SRTP key associated with said data packet and a transmitter roll-over counter (ROC) value, said transmitter ROC value corresponding to a counter in said transmitter that is incremented whenever a sequence number counter in said transmitter rolls over;
appending said transmitter ROC value to said data packet;
completing SRTP processing on said data packet; and,
transmitting said data packet to said receiver.

2. The method recited in claim 1, wherein said step of performing SRTP processing on said data packet comprises the step of deriving one or more keys for data protection of said data packet.

3. The method recited in claim 1, further comprising the step of said transmitter communicating out-of-band with said receiver to select a value of R.

4. The method recited in claim 1, wherein said sequence number counter comprises 16 bits.

5. The method recited in claim 4, wherein R is in the range of 1 to $2^{16}$.

6. The method recited in claim 3, wherein said transmitter and said receiver agree on said value of R using a protocol selected from the group consisting of:
Session Initiation Protocol (SIP);
Secure Real-Time Transport (SRTP); and
Multimedia Internet KEYing (MIKEY).

7. A method in a receiver for cryptographic synchronization of data packets, wherein said data packets are received from a transmitter using the Secure Real-Time Transport Protocol (SRTP) as defined in Internet Engineering Task Force (IETF) Request for Comments (RFC) 3711, said method comprising the steps of:
receiving a data packet from said transmitter;
performing SRTP processing on said data packet except SRTP key derivation;
determining if a transmitter roll-over counter (ROC) value is appended to said data packet, wherein the presence of a transmitter ROC value is indicated if the packet sequence number is evenly divisible by R, where R is an integer previously agreed to by said transmitter and said receiver;
if the data packet does not include a transmitter ROC value:
performing standard SRTP key derivation using conventional ROC estimation
if the data packet does includes a transmitter ROC value:
performing SRTP key derivation using the transmitter ROC value rather than a receiver ROC value;
determining the integrity of the data packet; and,
if the integrity of said data packet is not confirmed, dropping said data packet; otherwise,
if the integrity of said data packet is confirmed:
setting said receiver ROC value to the transmitter ROC value contained in said data packet;
removing said transmitter ROC value and a message authentication code (MAC) from said data packet; and,
completing SRTP processing on data packet.

8. The method recited in claim 7, wherein said step of determining the integrity of the data packet comprises the step of determining that said MAC is valid using the SRTP key derived using said transmitter ROC value.

9. The method recited in claim 7, further comprising the step of said receiver communicating out-of-band with said transmitter to select a value of R.

10. The method recited in claim 7, wherein R is in the range of 1 to $2^{16}$.

11. The method recited in claim 9, wherein said transmitter and said receiver agree on said value of R using a protocol selected from the group consisting of:
Session Initiation Protocol (SIP);
Secure Real-Time Transport (SRTP); and
Multimedia Internet KEYing (MIKEY).

12. A method for cryptographic synchronization of data packets, said method comprising the steps of:
receiving a data packet at a transmitter for transmission to a receiver, said data packet including a packet sequence number(s);
determining whether a function F(s) of said packet sequence number is equal to a predetermined value, where F(s) is previously agreed to by said transmitter and said receiver;
if F(s) is equal to said predetermined value:
computing and appending a code to said data packet, wherein said code is a function of an authentication key associated with said data packet and a transmitter roll-over counter (ROC) value, said transmitter ROC value corresponding to a counter in said transmitter that is incremented whenever a sequence number counter in said transmitter rolls over;
appending said transmitter ROC value to said data packet;
transmitting said data packet to said receiver; otherwise,
if F(s) is not equal to said predetermined value:
transmitting said data packet to said receiver without appending said transmitter ROC value;
receiving said data packet at said receiver;
determining if said transmitter ROC value is appended to said data packet, wherein the presence of a transmitter ROC value is indicated if F(s) is equal to said predetermined value;
if the data packet does includes a transmitter ROC value:
performing security processing using the transmitter ROC value rather than a receiver ROC value, said security processing comprising the steps of:
determining the integrity of the data packet; and,
if the integrity of said data packet is not confirmed, dropping said data packet; otherwise,
if the integrity of said data packet is confirmed:
setting said receiver ROC value to the transmitter ROC value:
if the data packet does not include a transmitter ROC value:
performing security processing using said receiver ROC value or an estimate of said ROC value.

13. The method recited in claim 12, further comprising the step of said transmitter communicating out-of-band with said receiver to select F(s).

14. The method recited in claim 12, wherein said sequence number counter comprises 16 bits.

15. The method recited in claim 12, wherein F(s)=1.

16. The method recited in claim 12, wherein said transmitter and said receiver agree on said F(s) using a protocol selected from the group consisting of:
Session Initiation Protocol (SIP);
Secure Real-Time Transport (SRTP); and
Multimedia Internet KEYing (MIKEY).

* * * * *

UNITED STATES PATENT AND TRADEMARK OFFICE
CERTIFICATE OF CORRECTION

PATENT NO.         : 7,725,709 B2                                                                  Page 1 of 1
APPLICATION NO.    : 11/470554
DATED              : May 25, 2010
INVENTOR(S)        : Naslund et al.

It is certified that error appears in the above-identified patent and that said Letters Patent is hereby corrected as shown below:

In Column 1, Line 37, delete "pocket" and insert -- packet --, therefor.

In Column 4, Line 10, delete "STRP" and insert -- SRTP --, therefor.

In Column 5, Line 31, delete "$2^{10}$-3" and insert -- $2^{16}$-3 --, therefor.

In Column 5, Line 51, delete "nightmost" and insert -- rightmost --, therefor.

In Column 6, Line 24, delete "F by" and insert -- F be --, therefor.

Signed and Sealed this

Third Day of August, 2010

David J. Kappos
*Director of the United States Patent and Trademark Office*